(12) United States Patent
Zhou et al.

(10) Patent No.: US 7,286,127 B2
(45) Date of Patent: Oct. 23, 2007

(54) LARGE MESH DEFORMATION USING THE VOLUMETRIC GRAPH LAPLACIAN

(75) Inventors: Kun Zhou, Beijing (CN); John Michael Snyder, Redmond, WA (US); Xinguo Liu, Beijing (CN); Baining Guo, Beijing (CN); Heung-Yeung Shum, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 156 days.

(21) Appl. No.: 11/158,428

(22) Filed: Jun. 22, 2005

(65) Prior Publication Data

US 2006/0290693 A1    Dec. 28, 2006

(51) Int. Cl.
    *G06T 15/00*    (2006.01)

(52) U.S. Cl. ..................................................... 345/420
(58) Field of Classification Search ................. 345/420
    See application file for complete search history.

(56) References Cited

OTHER PUBLICATIONS

Hoppe, "Progressive Meshes", 1996, ACM, pp. 99-108.*

* cited by examiner

*Primary Examiner*—Almis R. Jankus
(74) *Attorney, Agent, or Firm*—Lee & Hayes, PLLC (57) ABSTRACT

Large mesh deformation using the volumetric graph Laplacian is described. In one aspect, information is received from a user, wherein the information indicates how an original mesh is to be deformed. The original mesh is then deformed based on the information and application of a volumetric differential operator to a volumetric graph generated from the original mesh.

19 Claims, 8 Drawing Sheets

(a) Original mesh    (b) Poisson mesh editing    (c) VGL

LARGE MESH DEFORMATION USING THE VOLUMETRIC GRAPH LAPLACIAN

BACKGROUND

Mesh deformation is useful in a variety of applications in computer modeling and animation. For example, mesh deformation is useful to help artists sculpt stylized body shapes and deformations for three-dimensional (3-D) characters. However, large deformations such as those found of characters performing non-rigid and highly exaggerated movements, remain challenging today. Existing mesh deformation techniques often produce implausible results with unnatural volume changes.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In view of the above, large mesh deformation using the volumetric graph laplacian is described. In one aspect, information is received from a user, wherein the information indicates how an original mesh is to be deformed. The original mesh is then deformed based on the information and application of a volumetric differential operator to a volumetric graph generated from the original mesh

BRIEF DESCRIPTION OF THE DRAWINGS

In the Figures, the left-most digit of a component reference number identifies the particular Figure in which the component first appears.

DETAILED DESCRIPTION

Overview

Large mesh deformation using the volumetric graph Laplacian provides a novel technique for large deformations on 3-D meshes using the volumetric graph Laplacian. A graph representing the volume inside the input mesh is first constructed. The graph need not form a solid meshing of the input mesh's interior (the volumetric Laplacian operator can be applied to a volumetric graph without meshing surface interiors). Graph edges simply connect nearby points in the volume. The graph's Laplacian encodes volumetric details as the difference between each point in the graph and the average of its neighbors. Preserving these volumetric details during deformation imposes a volumetric constraint that prevents unnatural changes in volume. Also included in the graph are points a short distance outside the mesh. This assists in avoiding local self-intersections. Volumetric detail preservation is represented by a quadric energy function. Minimizing the quadric energy function preserves details in a least-squares sense, distributing error uniformly over the whole deformed mesh. The quadric energy function can also be combined with conventional constraints involving surface positions, details or smoothness, and efficiently minimized by solving a sparse linear system.

As described in greater detail below in reference to FIGS. 1 through 11, large mesh deformation using the volumetric graph Laplacian is implemented in a 2-D curve-based deformation system allowing novice and seasoned users alike to create substantially pleasing deformations with little effort. This novel large mesh deformation technique does not require skeletons and key poses of a 3-D model as input and can handle a wide range of non-rigid deformations. In one implementation, this system for large mesh deformation using the volumetric graph Laplacian is utilized to apply non-rigid and exaggerated deformations of 2-D cartoon characters to 3-D meshes.

An Exemplary System

Although not required, large mesh deformation using the volumetric graph Laplacian is described in the general context of computer-program instructions being executed by a computing device such as a personal computer. Program modules generally include routines, programs, objects, components, data structures, etc., that perform particular tasks or implement particular abstract data types. While the systems and methods are described in the foregoing context, acts and operations described hereinafter may also be implemented in hardware.

Figure 1:
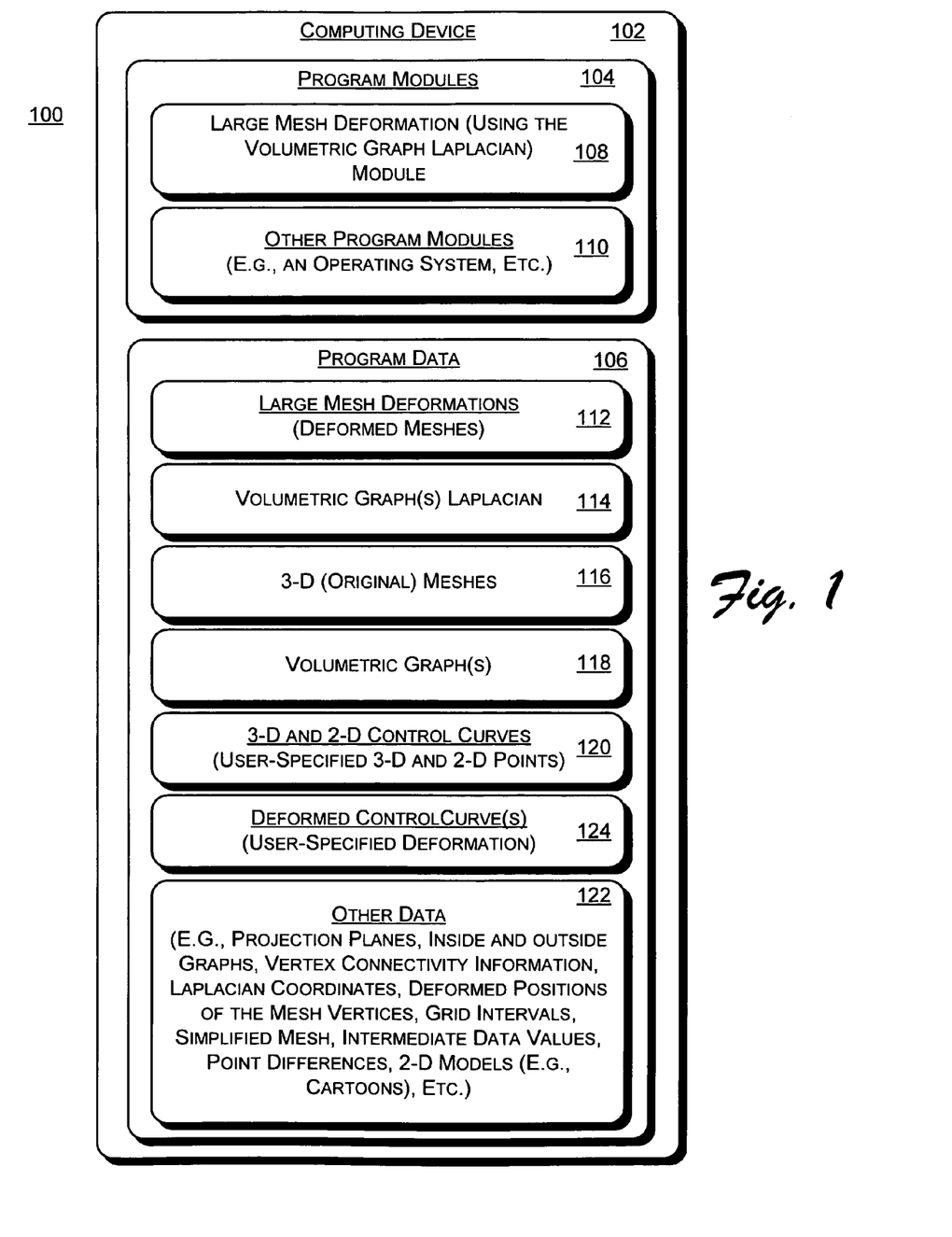
FIG. 1 shows an exemplary system for large mesh deformation using the volumetric graph Laplacian.

FIG. 1 shows an exemplary system 100 for large mesh deformation using the volumetric graph Laplacian. In this implementation, system 100 includes a general purpose computing device 102. Computing device 102 represents any type of computing device such as a personal computer, a laptop, a server, handheld or mobile computing device (e.g., a cellular phone, personal digital assistant), and/or so on.

Computing device 102 includes program modules 104 and program data 106. Program modules 104 include, for example, large mesh deformation (using the volumetric graph Laplacian) module 108 (hereinafter often referred to as "deformation module 108"), and other program modules 110 such as an operating system, etc. Deformation module 108 implements a novel technique to generate large mesh deformations 112 on volumetric graph Laplacian's (VGLs)

114 generated from 3-D meshes 116 (original meshes). Deformation module 108 utilizes VGL to represent volumetric details as the difference between each point in a 3-D volume and the average of its neighboring points in a graph. VGL allows deformation module 108 to preserve surface details using differential domain techniques, and thereby produce visually pleasing deformation results 112 by distributing errors globally through least-squares minimization. By working in the volumetric domain instead of on the surface of mesh 116, deformation module 108 utilizes VGL to effectively impose volumetric constraints, and thereby avoid unnatural volume changes and local self-intersections.

Figure 2:
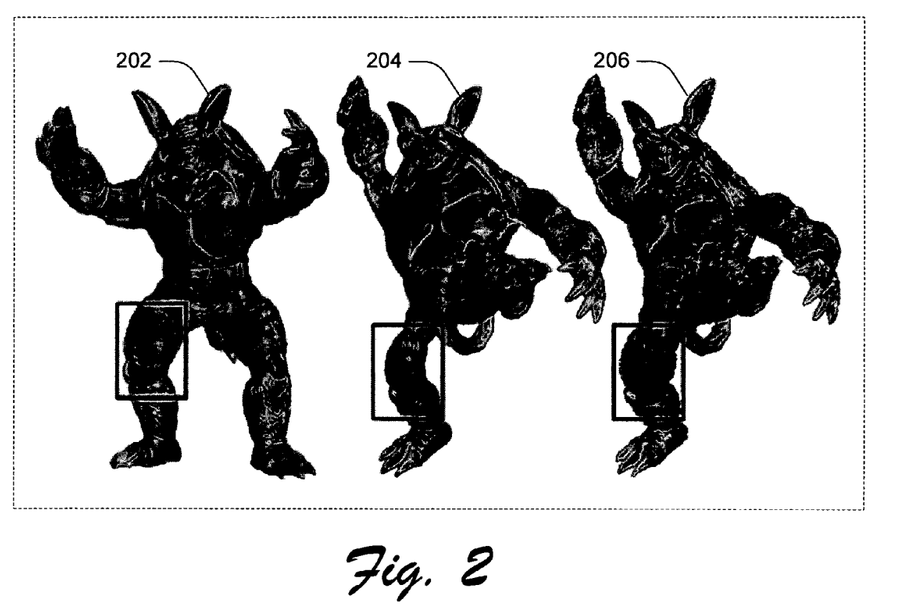
FIG. 2 shows an exemplary comparison of a conventional large mesh deformation and a large mesh deformation using the volumetric graph Laplacian 114.

FIG. 2 shows an exemplary comparison of a conventional large mesh deformation and a large mesh deformation using the volumetric graph Laplacian 114. More particularly, image 202 shows an exemplary original mesh 116. Image 204 shows an exemplary result of deforming the original mesh 116 using conventional Poisson editing mesh deformation techniques. Image 206 shows an exemplary result of large mesh deformation of the original mesh 116 using the volumetric graph Laplacian 114. As shown in the example of image 204, deformation of the original mesh 116 using Poisson mesh editing causes unnatural shrinkage, especially in the model's right thigh.

Using a volumetric graphic Laplacian 114, deformation module 108 represents volumetric constraints by a quadric energy function. Deformation module 108 officially minimizes this function by a sparse linear system, and combines the function with other surface constraints (e.g., on surface positions, surface details, surface smoothness, etc.). To apply a volumetric graph Laplacian 114 to a triangular mesh, deformation module 108 first constructs a volumetric graph 118, which includes points of the original mesh 116 as well as points derived, as described below, from a simple lattice (inside graph) lying inside the mesh 116. Graph edges connect these points. These graph edges are a superset of the edges of the original mesh 116. The graph need not form a meshing (volumetric tessellation into tetrahedra or other finite elements) of the interior of the mesh 116.

A user specifies a deformation by identifying a limited set of points 120 (one or more control curves) on the original mesh 116. The specified points 120 define a curve and indicate where these points 120 migrate to in a resulting deformation. For purposes of exemplary illustration, specified points 120, in this example, identify a curve. Deformation module 108 generates a quadric energy function with a minimum to map specified points 120 to their specified destination while maintaining surface detail and roughly preserving volume.

In this manner, deformation module 108 solves the problem of large mesh deformation by applying a volumetric differential operator to a volumetric graph 118 without meshing surface interiors. In contrast, conventional differential approaches considered only surface operators. A naive way to extend these operators from surfaces to solids is to define them over a tetrahedral mesh of the object interior. However, solidly meshing a complex object is notoriously difficult. Existing mesh deformation techniques typically re-mesh geometry and disturb its connectivity, thereby violating a common requirement in mesh deformation. Solid meshing also implies many constraints (e.g., that no tetrahedron be flipped and that each interior vertex remain in the visual hull of its neighbors). Such constraints make computationally impractical for conventional mesh deformation techniques to economically distribute interior points, and add an "exterior shell" (as performed by system 100) to prevent local self-intersection.

Exemplary operations of deformation module 108 to deform a volumetric graph 118 and perform deformation from 2-D curves (respective portions of specified points 120) are now described.

Exemplary Deformation of the Volumetric Graph

Let M=(V,K) be a triangular mesh 116 targeted for deformation, where V is a set of n point positions (i.e., point set of the original mesh 116), $V=\{p_i \epsilon R^3 | 1 \leq i \leq n\}$, and K is an abstract simplicial complex containing all vertex connectivity information. For purposes of exemplary illustration, such vertex connectivity information is shown as a respective portion of "other data" 122. There are three types of elements in K, vertices $\{i\}$, edges $\{i,j\}$ and faces $\{i,j,k\}$.

Laplacian Deformation on Abstract Graphs

Suppose G=(P,E) is a graph, where P is a set of N point positions, wherein $P=\{p_i \epsilon R^3 | 1 \leq i \leq N\}$, and $E=\{(i,j)|p_i$ is connected to $p_j\}$ is the set of edges. The Laplacian of a graph is analogous to the Laplace operator on manifolds. The Laplacian computes the difference between each point $p_i$ in the graph G and a linear combination of its neighboring points:

$$\delta_i = L_G(p_i) = p_i - \sum_{j \in N(i)} w_{ij} p_j, \qquad (1)$$

where $N(i)=\{j|\{i,j\} \epsilon E\}$ are the edge neighbors, $w_{ij}$ is the weight for point $p_j$, and $\delta_i$ is the Laplacian coordinate of the point $p_i$ in graph G. $L_G$ is called the Laplace operator of the graph G. Weights $w_{ij}$ are positive and satisfy $\Sigma_{j \epsilon N(i)} w_{ij}=1$. The simplest weighting is uniform weighting $w_{ij}=1/|N(i)|$. (Deformation module 108 implements a more complicated weighting scheme, as described below in the section titled "Exemplary Deformation of the Volumetric Graph").

To control a deformation, these are inputs deformed positions as control curves (i.e., specified points 120) $q_i, i \epsilon \{1, \ldots, m\}$ for a subset of the N mesh vertices. Deformation module 108 utilizes these specified control curves to compute a new (deformed) Laplacian coordinate $\delta'_i$ for each point i in the graph. The deformed positions of the mesh vertices $p'_i$ (e.g., see "other data" 122) are then obtained by solving the following quadric minimization problem:

$$\min_{p'_i} \left( \sum_{i=1}^{N} \|L_G(p'_i) - \delta'_i\|^2 + \alpha \sum_{i=1}^{m} \|p'_i - q'_i\|^2 \right). \qquad (2)$$

The first term of equation (2) represents preservation of local detail and the second term constrains the positions of those vertices 120 directly specified by the user. The parameter $\alpha$ balances these two objectives.

The deformed Laplacian coordinates are computed as follows:

$$\delta'_i = T_i \delta_i$$

where $\delta_i$ is the Laplacian coordinate in the rest pose, defined in equation (1), and $T_i$ transforms the Laplacian coordinate into the deformed pose. In this implementation, a general transform $T_i$ which includes anisotropic scaling is too powerful and can "fit away" local detail. To address this, deformation module 108 restricts $T_i$ to a rotation and isotropic scale.

Given the deformed positions of a subset of the vertices $q_i$, well-known methods can be used to obtain $T_i$. In this implementation, deformation module 108 utilizes a method described below in the section titled "Exemplary Deformation of the Volumetric Graph". This methodology propagates the local transformation from the specified region of deformation to the entire mesh (resulting in a large mesh deformation 112), blending the transform towards the identity away from the deformation site.

If the graph is a triangular mesh, the graph Laplacian is identical to the mesh Laplacian (in this example, a mesh, or surface Laplacian is a Laplacian of the original mesh). Using the mesh Laplacian to encode surface details, detailed geometric structure is preserved over a wide range of editing operations. However, for large deformations, such methodologies exhibit unnatural volume changes (e.g., see image (a) of FIG. 3), and/or local self-intersections (e.g., see image (a) of FIG. 4).

Figure 3:
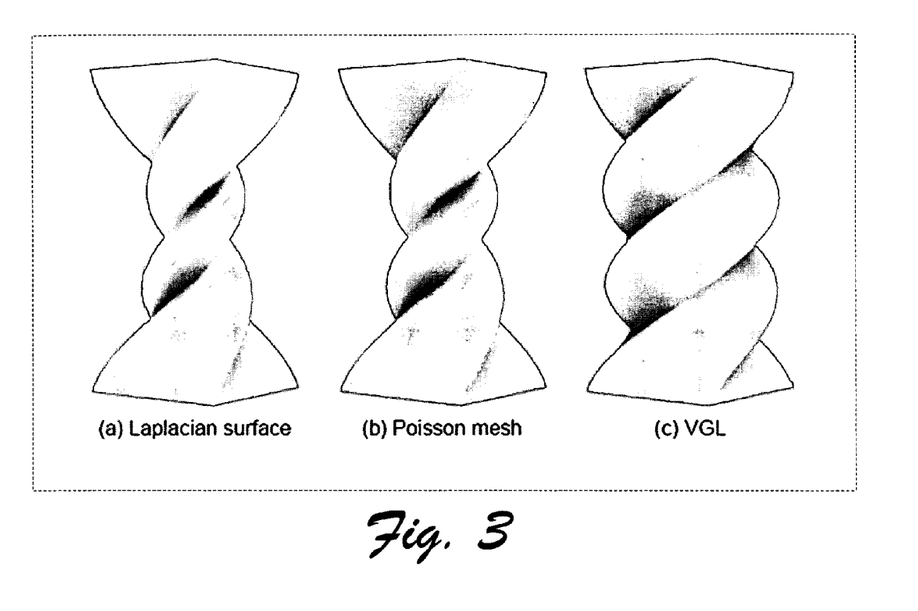
FIG. 3 shows exemplary large twist deformation results.

FIG. 3 shows exemplary large twist deformation results. More particularly, image (a) of FIG. 3 shows exemplary large twist deformation based on Laplacian surface. Image (b) of FIG. 3 shows exemplary large twist deformation based on a Poisson mesh. Image (c) shows exemplary large twist deformation based on the VGL operations of deformation module 108.

Figure 4:
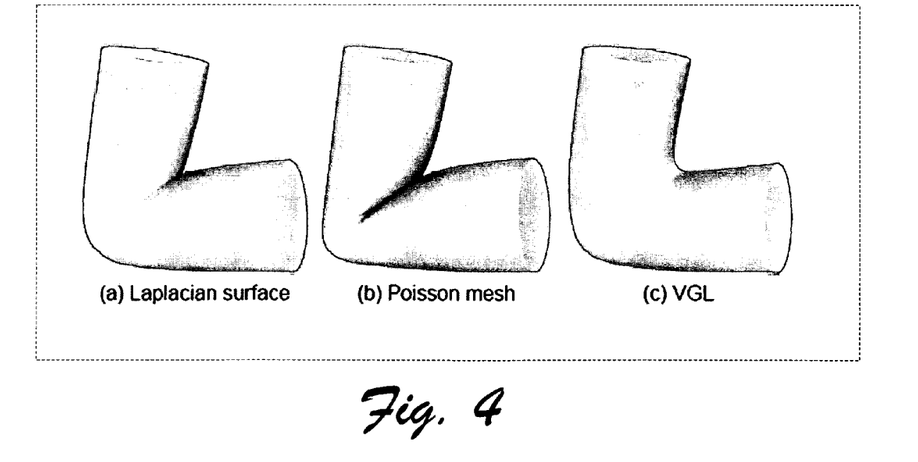
FIG. 4 shows exemplary large bend deformation results

FIG. 4 shows exemplary large bend deformation results. More particularly, image (a) of FIG. 4 shows exemplary large bend deformation based on Laplacian surface. Image (b) of FIG. 3 shows exemplary large bend deformation based on a Poisson mesh. Image (c) shows exemplary large bend deformation based on the VGL operations of deformation module 108.

We now describe how deformation module 108 imposes volumetric constraints by constructing a volumetric graph 118 for an original mesh 116 to reduce unnatural volume changes and/or local self-intersections.

Exemplary Construction of a Volumetric Graph

Deformation module 108 avoids large volume changes and local self-intersections, but does not guarantee elimination of global self-intersections. In this implementation, global self-intersections are managed by a user. Deformation module 108 builds a volumetric graph 118 utilizing two types of intermediate graphs: inside and outside graphs. An inside graph $G_{in}$ fills the interior volume of the mesh 116 and prevents large volume changes, while an outside graph $G_{out}$ prevents local self-intersection.

Figure 5:
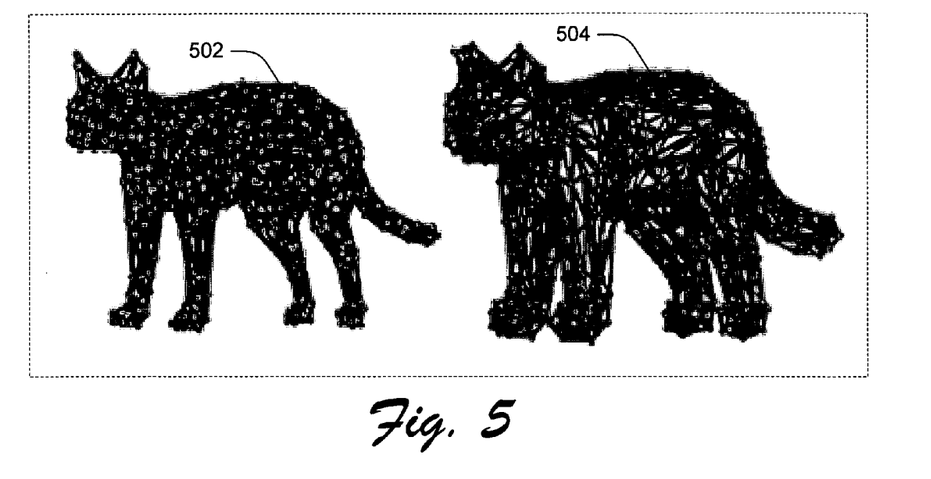
FIG. 5 shows an exemplary volumetric graph.

FIG. 5 shows an exemplary volumetric graph 118. More particularly, volumetric graph 502 illustrates exemplary $G_{in}$, and volumetric graph 504 illustrates exemplary $G_{out}$.

One method to obtain $G_{in}$ is to tetrahedralize the interior volume of a surface mesh 116. However, tetrahedral mesh generation is typically substantially difficult and computationally expensive to implement, not to mention that such mesh generation is generally difficult to implement in a robust manner (e.g. typically producing poorly shaped tetrahedra for complicated models). Rather than tetrahdralizing the interior volume of a surface mesh 116, deformation module 108 implements substantially simpler operations produce the less-restrictive volumetric graph.

Figure 6:
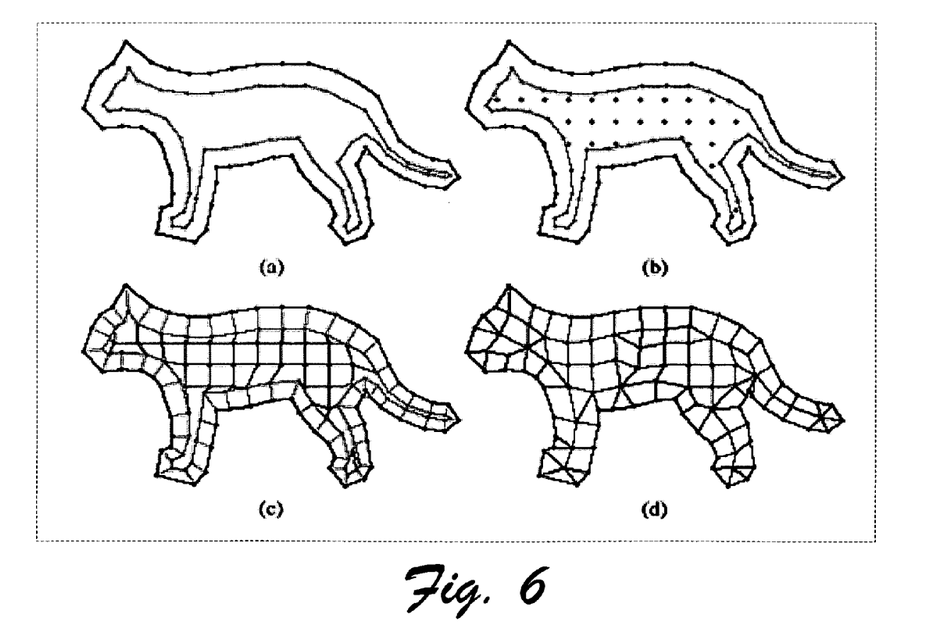
FIG. 6 shows exemplary operations to construct a volumetric graph.

FIG. 6 shows exemplary steps to construct a volumetric graph 118. More particularly, and in this implementation as shown in FIG. 6, deformation module 108 generates a volumetric graph 118 as follows:

- Construct an inner shell $M_{in}$ for the mesh M by offsetting each vertex a distance in the direction opposite its normal. This is illustrated, for example, in image (a) of FIG. 6.
- Embed $M_{in}$ and M in a body-centered cubic (BCC) lattice. Remove lattice nodes outside. Results of these exemplary operations are shown, for example, in image (b) of FIG. 6.
- Build edge connections among M, $M_{in}$, and lattice nodes. Results of this operation are shown, for example, in image (c) of FIG. 6.
- Simplify the graph using edge collapse and smooth the graph. Results of this operation are shown, for example, in image (d) of FIG. 6.

In this implementation, the purpose of the inner shell $M_{in}$ is to ensure that inner points are inserted even within thin features (e.g., like the tail of the cat) that may be missed by lattice sampling operations. To compute the inner shell, deformation module 108 utilizes operations based on simplification envelopes. In each iteration, deformation module 108 attempts to move each vertex a fraction of the average edge length opposite to its normal vector. After moving a vertex, deformation module 108 tests its adjacent triangles for intersections with each other and the rest of the model. If no intersections are found, results of these operations are accepted. Otherwise, results of the operations are rejected and the vertex is moved back. The iterations terminate when all vertices have been moved the desired distance or can no longer be moved.

Figure 7:
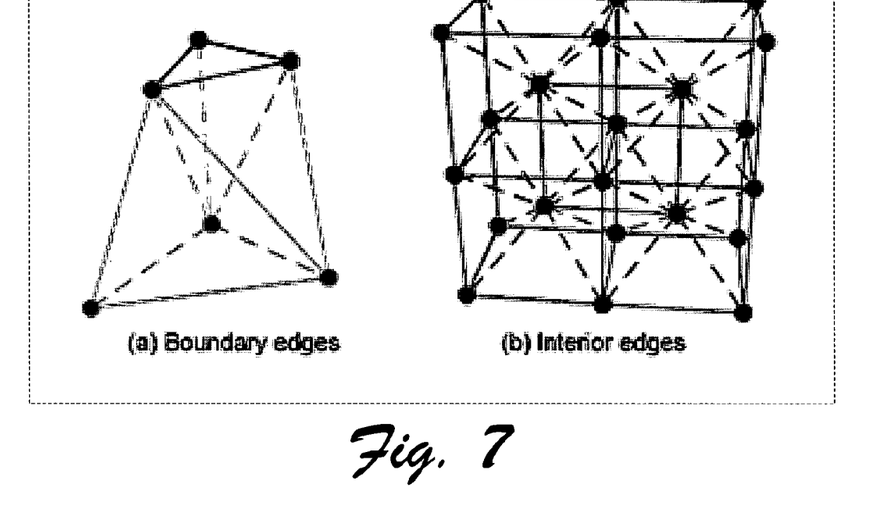
FIG. 7 shows exemplary types of edge connections in a volumetric graph.

FIG. 7 shows exemplary types of edge connections in a volumetric graph. More particularly, image (a) of FIG. 7 shows exemplary boundary edges. Image (b) of FIG. 7 shows exemplary interior edges. In view of these examples, it can be seen that a BCC lattice includes nodes at every point of a Cartesian grid along with the cell centers (e.g., image (b)). Node locations may be viewed as belonging to two interlaced grids. This lattice occurs as a crystal structure in nature with desirable rigidity properties. In this implementation, the great interval is set to equal the average edge length.

Three types of edge connections form an initial volumetric graph 118. First, deformation module 108 connects each vertex in M to its corresponding vertex in $M_{in}$ (e.g., FIG. 7, image (a)). The shorter diagonal for each prism face is included as well. Second, deformation module 108 connects each inner node of the BCC lattice with its eight nearest neighbors in the other interlaced grid (e.g., FIG. 7, image (b)). Third, deformation module 108 connects $M_{in}$ and nodes of the BCC lattice. For each edge in the BCC lattice that intersects $M_{in}$ and has at least one node inside $M_{in}$, deformation module 108 connects the BCC lattice node inside $M_{in}$ to the point in $M_{in}$ closest to this intersection.

Deformation module 108 implements simplification and smoothing operations on the initial graph to make the graph more uniform. To this end, deformation module 108 evaluates the edges of graph 118 in increasing order of length. If the length of an edge is less than a threshold (half the average edge length of M), it is collapsed to the edge's midpoint. After simplification, several smoothing iterations (three in our implementation) are performed in which each point is moved to the average of its neighbors. In this implementation, neither simplification nor smoothing are applied to the vertices of M.

To construct the outside graph $G_{out}$ (part of volumetric graph 118 generation operations), deformation module 108 utilizes the iterative normal-offset method described previously to construct this volumetric graph, but toward the outside rather than inside the surface, to form $M_{out}$. Deformation module 108 builds the connection between M and $M_{out}$ in the same way as between M and $M_{in}$.

Note that in this implementation, both $G_{in}$ and $G_{out}$ are intermediate data structures (respectively represented in "other data" 122) that are not directly viewed by a user, and that are discarded after user interaction. These data structures serve only to constrain the deformation of the mesh surface. Though intersections of $M_{in}$ and $M_{out}$ with themselves and with M can occur, especially on meshes containing regions of high curvature, such intersections cause no difficulty in interactive system 100.

Exemplary Deformation of the Volumetric Graph

To balance between preserving the original surface's details and constraining the volume, deformation module 108 utilizes a modification of the energy function in Equation (2) to the following general form:

$$\sum_{i=1}^{n}\|L_M(p'_i)-\varepsilon'_i\|^2+\alpha\sum_{i=1}^{m}\|p'_i-q_i\|^2+\beta\sum_{i=1}^{N}\|L_{G'}(p'_i)-\delta'_i\|^2, \quad (3)$$

wherein the first n points in graph G belong to the mesh M. $L_M$ is the discrete mesh Laplacian operator. G' is the subgraph of G formed by removing those edges belonging to M. For points on the original mesh M, $\varepsilon'_i (1 \leq i \leq n)$ are the mesh Laplacian coordinates in the deformed coordinate frame. For points in the volumetric graph G', $\delta'_i (1 \leq i \leq N)$ are the graph Laplacian coordinates in the deformed frame. Energy is thus decomposed into three terms corresponding to preservation of surface details, enforcement of a user's chosen deformation locations (specified points 120), and preservation of volumetric details/rigidity.

β balances between surface and volumetric details. Deformation module 108 specifies $\beta^{0/1}$ where $\beta=n\beta^{0/0}/N$. Factor n/N normalizes the weight so that it is insensitive to the lattice density of the volumetric graph. With this normalization, $\beta^{0/0}=1$ preserves volume and prevents self-intersections. In this implementation, $0.1<\alpha<1$, and α is not normalized. This is because it is desirable for the constraint strength to depend on the number of constrained points relative to the total number of mesh points. In this implementation, α is set to 0.2 by default.

In an alternative embodiment, the volumetric constraint of Equation (3) is combined with the quadric smoothness energy (this is not done if the focus is to deform models with significant geometric detail).

Exemplary Propagation of Local Transforms

To obtain the local transforms $T_i$ that take the Laplacian coordinates in the rest frame, $\delta_i$ and $\varepsilon_i$, to the new Laplacian coordinates $\delta'_i$ and $\varepsilon'_i$ in the deformed frame, deformation module 108 implements WIRE deformation operations. In these operations, deformation module 108 selects a sequence of mesh vertices forming a curve 120. These selected mesh vertices are then deformed to a new state. This curve controls the deformation and defines the $q_i$ (e.g., see image (a) of FIG. 8).

Figure 8:
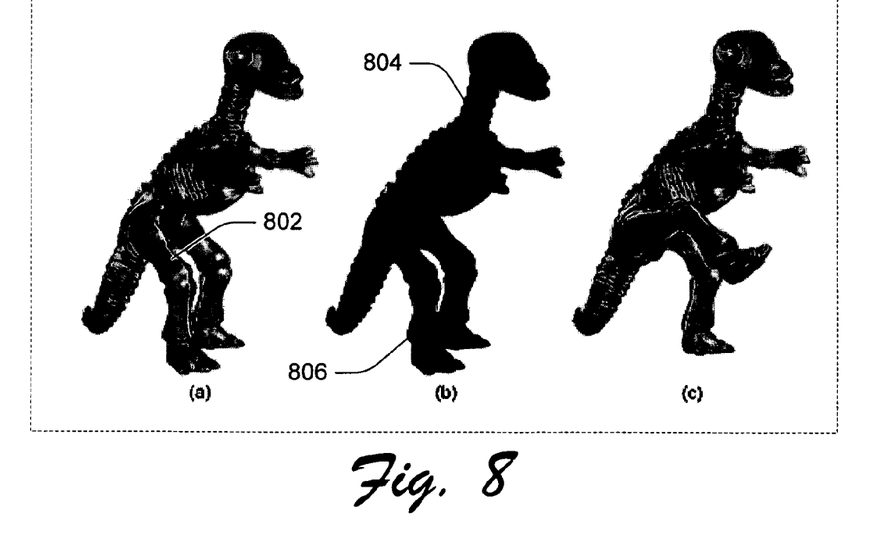
FIG. 8 shows exemplary curve-based deformation.

FIG. 8 shows exemplary curve-based deformation. More particularly, FIG. 8, image (a), shows and exemplary original mesh 116 and an exemplary control curve 802. Image (b) of FIG. 8, shows exemplary strength fields of 0 (e.g., field 804—darker shading) and 1 (e.g., field 806—lighter shading). FIG. 8, image (c), shows an exemplary deformed mesh generated from curve-based deformation operations of deformation module 108 of FIG. 1.

A control curve (e.g., control curve 802) specifies only the extent of where vertices on the curve are to be deformed. Deformation module 108, utilizing the propagation algorithm, first determines where neighboring graph points (1-ring mesh neighbors of the control points) deform to, then infers local transforms at the curve points, and finally propagates the transforms over the whole mesh (e.g., resulting in a deformed mesh 112). These operations began by locating mesh neighbors of the $q_i$ and obtaining their deformed positions using WIRE. More particularly, let C(u) and C'(u) be the original and deformed control curves respectively, parameterized by arc length $u \in [0,1]$. Given a neighboring point $p \in R^3$, let $u_p \in [0,1]$ be the parameter value minimizing distance between p and the curve C(u). The deformation maps p to p' such that C maps to C' and points nearby move analogously:

$$p'=C'(u_p)+R(u_p)(s(u_p)(p-C(u_p))).$$

In this equation, R(u) is a 3×3 rotation matrix which takes a tangent vector t(u) on C and maps it to its corresponding tangent vector t'(u) on C' by rotating around t(u)×t'(u)·s(u) is a scale factor. It is computed at each curve vertex as the ratio of the sum of lengths of its adjacent edges in C' over this length sum in C, and then defined continuously over u by linear interpolation.

The deformed coordinates for each point on the control curve and for its 1-ring neighbors on the mesh have now been determined. At this point, operations of deformation module 108 proceed to compute the $T_i$ at each point on the control curve. Deformation mud 108 defines a rotation by computing a normal and a tangent vector as the perpendicular projection of one edge vector with this normal. The normal is computed as a linear combination weighted by face area of face normals around the mesh point i. The rotation is represented as a quaternion, which means the rotation angle should be less than 180 degrees. The scale factor of $T_i$ is given by $s(u_p)$.

The transform is then propagated from the control curve to all graph points p via a deformation strength field $f(p)$ which decays away from the deformation site (e.g., see image (b) of FIG. 8). Constant, linear, and Gaussian strength fields can be chosen and are based on the shortest edge path (discrete geodesic distance) from p to the curve.

In one implementation, deformation module 108 implements a simple propagation scheme by assigning to p a rotation and scale from the point $q_p$ on the control curve closest to p. A smoother result is obtained by computing a weighted average over all the vertices on the control curve instead of the closest. Weighting by the reciprocal of distance $1/\|p-q_i\|_g$ or by a Gaussian function such as:

$$\exp\left(-\frac{(\|p-q_i\|_g-\|p-q_p\|_g)^2}{2\sigma^2}\right)$$

Such a Gaussian function works well in system 100. $\|p-q\|_g$ denotes the discrete geodesic distance from p to q. The term σ controls the width of the Gaussian. Weighting between multiple curves is similar, except that the quaternion and scale is accumulated over multiple curves.

The final transform matrix at point p is:

$$T_p = f(p)T^{O/O}_p + (1-f(p))I$$

where $T^{O/O}_p$ is p's weighted average transform. This formula simply blends that transform with the identity using the strength field. Laplacian coordinates thus approach their original (rest) state outside the deformation's influence region.

In contrast to conventional propagation schemes, the propagation scheme implemented by deformation module 108, computes a transform for each graph vertex and applies the transform to its Laplacian coordinate. Additionally, some conventional techniques generally compute a transform for each triangle and apply it to the triangle's vertices. However, independently transforming each triangle disconnects it from its neighbors in the mesh. The Poisson equation stitches triangles back together to preserve each triangle's orientation and scale in a least-squares sense. Extending this to a volumetric domain requires a tetrahedral mesh.

Rather than computing transforms at the deformation site and propagating the transformations away from the deformation site, conventional mesh deformation techniques introduce additional degrees of freedom by defining an unknown, least-squares optimal transform, which takes a local neighborhood of points from the rest state to the deformed state. The defined transform is typically restricted to rotations and scales to prevent loss of local detail. For the system to remain quadratic and thus easily solvable, rotations are defined using the small-angle approximation. This conventional technique provides a poor approximation for large deformations, which then require more complicated, iterative refinement.

Exemplary Weighting Scheme

For the mesh Laplacian $L_M$, deformation module 108 utilizes a weighting scheme with cotangent weights:

$$w_{ij} \propto (\cot \alpha_{ij} + \cot \beta_{ij}),$$

where $\alpha_{ij} = \angle(p_i, p_{j-1}, p_j)$ and $\beta_{ij} = \angle(p_i, p_{j+1}, p_j)$.

For the graph Laplacian $L_G$, deformation module 108 computes the weights by solving a quadratic programming problem. Independently for each graph vertex i, deformation module 108 solves the following problem to obtain the weights $w_{ij}$ (for clarity the i subscript is dropped):

$$\min_{w_j} \left( \left\| p_i - \sum_{j \in N(i)} w_j p_j \right\|^2 + \lambda \left( \sum_{j \in N(i)} w_j (p_i - p_j) \right)^2 \right)$$

$$\text{subject to } \sum_{j \in N(i)} w_j = 1 \text{ and } w_j > \xi.$$

Referring to the above equation, the first energy term aims at weights that generate Laplacian coordinates of smallest magnitude. The second term is based on a scale-dependent umbrella operator, which prefers weights in inverse proportion to the edge lengths. The parameter $\lambda$ balances these two objectives, while the parameter $\xi$ prevents small weights. In this implementation, $\lambda$ and $\xi$ are both set to equal 0.01.

Figure 9:
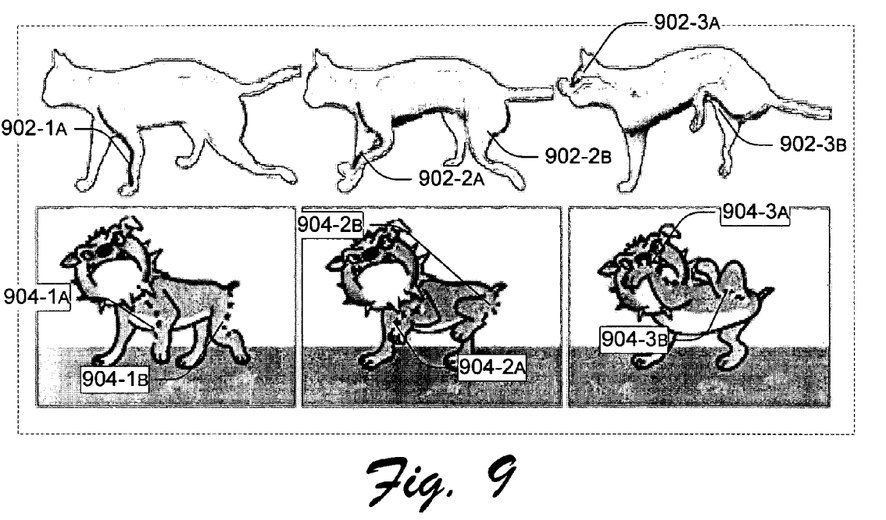
FIG. 9 shows an exemplary comparison of weighting schemes, including uniform, reciprocal of edge length, and heat kernel (decaying exponential function of squared distance) weighting schemes.

FIG. 9 shows an exemplary comparison of weighting schemes, including uniform (a), reciprocal of edge length (b), and heat kernel (decaying exponential function of squared distance) (c). As shown in these exemplary comparisons, the weighting scheme implemented by the deformation module of system 100 shown in image (d) is smoother and more uniform than the results from other weighting schemes.

Exemplary Quadric Energy Minimization

Given the new Laplacian coordinates, deformation module 108 minimizes the quadric energy in Equation (3) by solving the following equations:

$$L_M(p'_i) + \beta L_G(p'_i) = \epsilon'_i + \beta \delta'_i, \quad i \in 1, \ldots, n,$$

$$\beta L_G(p'_i) = \beta \delta'_i, \quad i \in n+1, \ldots, N,$$

$$\alpha p'_i = \alpha q'_i, \quad i \in 1, \ldots, m$$

This is a sparse linear system Ax=b. The matrix A is dependent only on the graph before deformation while b is also dependent on the current Laplacian coordinates and position constraints. Therefore, A is fixed as long as deformation module 108 does not switch the mesh or graph and the control points while b changes constantly during interactive deformation. Thus, deformation module 108 precomputes $A^{-1}$ using LU decomposition and dynamically executes the back substitution step to obtain $A^{-1}$ b.

Exemplary Multi-Resolution Operations

Multi-resolution editing can be used to accelerate differential methods, especially for very large models. For example, the Stanford armadillo model of FIG. 2 contains 170K vertices. Deformation module 108 generates almost six times as many variables as vertices in the linear system to be solved when creating the volumetric graph for the model. Solving such a large system is computationally expensive for an interactive system. In one implementation to reduce computation expense, deformation module 108 generates a simplified mesh with fewer vertices (e.g., 15K for the armadillo). A volumetric graph 118 is then generated from the simplified mesh. After deforming the simplified representation of the mesh, deformation module 108 adds back details to get a deformed high-resolution mesh.

Exemplary Deformation From 2-D Curves

The basic mode of interaction of system 100 is as follows. A user first specifies a control curve 120 on the mesh surface 116 by selecting a sequence of mesh vertices which are connected by the shortest edge (Dijkstra) path. This 3-D curve is projected onto one or more planes (projection planes) to obtain 2-D curves which can then be edited. After editing, the modified 2-D curves are projected back to 3-D to get the deformed control curve, which forms the basis for deformation of the previous section.

Exemplary Curve Projection

Given the original control curve, deformation module 108 automatically selects a projection plane based on the original control curve's average normal and principal vectors. Deformation module 108 computes the principal vectors as the two eigenvectors corresponding to the largest eigenvalues from a principal component analysis (PCA) over the curve's vertices. In most cases, the cross product of the average normal and the first principal vector provides a satisfactory plane. When the length of the average normal vector is small, as for a closed planar curve, the two principal vectors are utilized instead. In this implementation, a user can also directly choose or modify the projection chosen by system 100.

Exemplary Curve Editing

Projected 2-D curves inherit geometric detail from the original mesh 116 which complicates editing. Multi-resolution curve editing provides one solution for B-spline curves. Deformation module 108 implements editing operations for discrete curves based on Laplacian coordinates. The Laplacian coordinate of a curve vertex is the difference between its position and the average position of its two adjacent neighbors, or single neighbor for terminal vertices.

The discrete 2-D curve to be edited is denoted as C. A cubic B-spline curve $C_b$ is first computed as a least-squares fit to C, representing C's low frequencies. Then a discrete version of $C_b$, denoted $C_d$, is computed by mapping each vertex of C onto $C_b$ using proportional arc-length mapping. The simple B-spline curve $C_b$ can now be conveniently edited. After editing, deformation module 108 obtains the modified B-spline curve $C'_b$ and a new discrete version $C'_d$. These curves indicate the user's desired deformation but lack the original curve's detail. To restore the original curves detail, deformation module 108, at each vertex of C, identifies the unique rotation and scale that map its location from $C_d$ to $C'_d$. Applying this transformation to the Laplacian coordinates on C and solving equation (2) (without the second point constraint term) over the simple curve graph, results in the generation of a new curve C'. This new curve preserves the details of C but follows the user's coarse-scale modification. Essentially, this is a trivial version of local transform "propagation" for deforming a mesh, but for the curve case it can be defined independently per point and need not be propagated.

This algorithm is posed as a curve analogy: given a pair of source curves, $C_s$ and $C'_s$, and a target curve C, generate a new curve C' such that the relationship between C and C' is analogous to the relationship between $C_s$ and $C'_s$. While conventional mesh deformation operations may directly transform vertices, deformation module 108 transforms corresponding differential coordinates of the vertices to more uniformly distributed errors across the whole curve.

Initially, $C_b$ has two knots at the curve endpoints. A user can add knots to perform editing at a more detailed level. System 100 supports two editing modes: one manipulates a coarse-scale fit to the original curve, $C_b$, and the other sketches an entirely new curve. In the latter case, correspondence between the sketched curve and the control curve is achieved by arclength by default. In this implementation, the user can also specify a series of corresponding points between the two curves.

Exemplary Deformation Re-Targeting From 2-D Cartoons

In one implementation, system 100 re-targets deformation of 2-D cartoons to 3-D meshes 112 is a direct exemplary application of system 100's 2-D sketch-based deformation. To this end, a user specifies one or more 3-D control curves 120 on the mesh 116 along with their projection planes, and for each curve, a series of 2-D curves 120 in the cartoon image sequence that will be used to drive the deformation of mesh 116.

FIG. 9 shows exemplary 3-D and 2-D control curve specification for deformation retargeting from 2-D images. More particularly, control curve sets 902 (i.e., 902-1a through 902-3b) are specified on a 3-D mesh, and control curve sets 904 (i.e., 904-1a through 904-3b) are specified on a 2-D image. (For purposes of exemplary illustration, 2-D and 3-D control curves are shown as specified points 120 of FIG. 1).

Suppose that $C_i$ is the projection of a 3-D control curve 902, and its corresponding curves 904 in the cartoon sequence are $C_{i,j}, j \in \{1, \ldots, k\}$. The index i is for different control curves, driving different parts of the model like arms and legs. The index j is the frame index—the same control curve has a corresponding cartoon curve for each frame. Deformation module 108 automatically derives a deformation sequence mapping $C_i$ to successive $C_{i,j}$. With respect to these deformation operations, it is not necessary to generate a deformation from scratch at every frame. In one implementation, a user may select just a few key frames and specify cartoon control curves just for the selected key friends, rather than specifying control curves for an entire frame sequence. Deformation module 108 implements automatic interpolation operations based on differential coordinates to interpolate between key frames. For example, suppose there are two meshes M and M' with the same connectivity. These two meshes represent the deformed mesh 112 at two key frames.

Deformation module 108 begins by computing Laplacian coordinates for each vertex on the two meshes. Deformation module 108 computes a rotation and scale in the local neighborhood of each vertex p, taking the Laplacian coordinate from its location in M to M' (e.g., see the above section titled "Exemplary Deformation of the Volumetric Graph"). Denote the transformation by $T_p$. By interpolating each transformation from the identity to $T_p$ over time, we get a smoothly varying Laplacian coordinate from M to M'. At this point, deformation module 108 solves the equation (2) to provide a sequence of meshes from M to M'.

The 2-D cartoon curves only specify how the deformed curve projects in a single plane, leaving unspecified its shape perpendicular to the plane. In view of this, system 100 allows a user to select other projection planes to specify these extra degrees of freedom, if desired.

Figure 10:
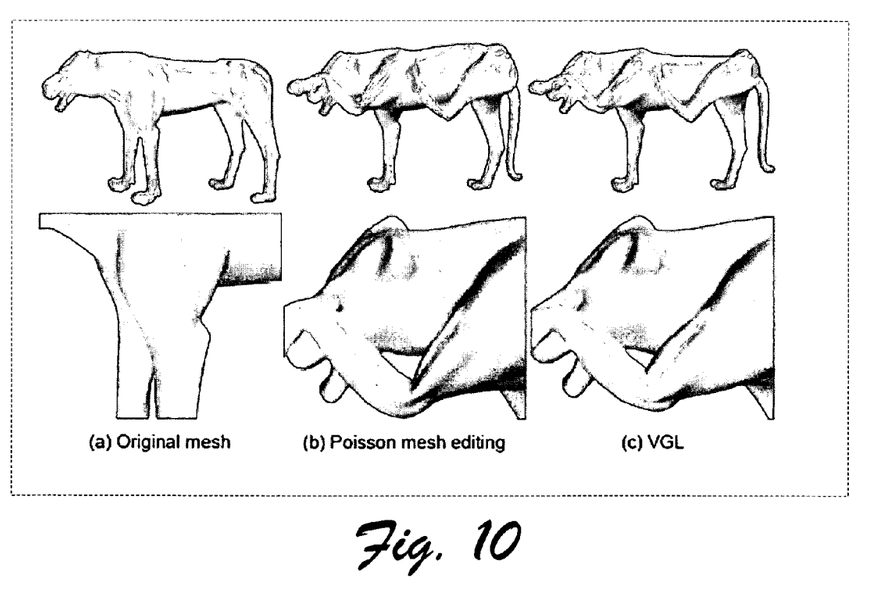
FIG. 10 shows exemplary comparisons of conventional large mesh deformation techniques as compared to the large mesh deformation using the volumetric graph Laplacian.

FIG. 10 shows additional exemplary comparisons of conventional large mesh deformation techniques as compared to the large mesh deformation using the volumetric graph Laplacian of system 100. More particularly, from left to right, the top row respectively shows an image of an original mesh, and exemplary image showing results of Poisson mesh editing the deformation, and an image showing exemplary results of large mesh deformation using the volumetric graph Laplacian. The second, or bottom row, respectively shows enlarged portions of the deformed regions associated with the immediately above image in the top row. That is, images in column (a) are associated with an original mesh 116, images in column (b) correspond to results of the original mesh having been deformed using Poisson mesh editing, and images in column (c) correspond to results of the original mesh having been deformed using large mesh deformation using the volumetric graph Laplacian of system 100.

Exemplary Procedure

Figure 11:
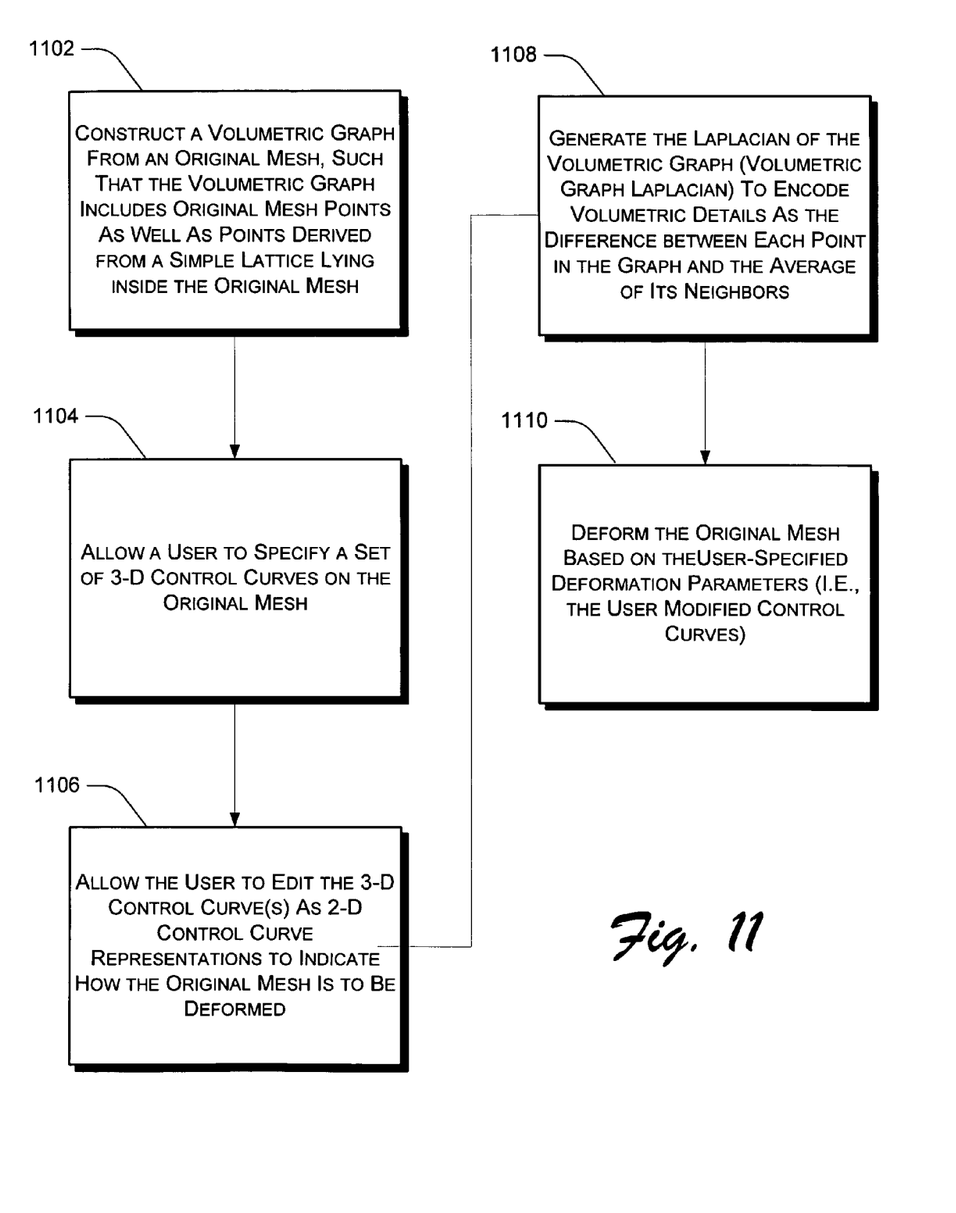
FIG. 11 shows an exemplary procedure for large mesh deformation using volumetric graph Laplacian.

FIG. 11 shows an exemplary procedure 1100 for large mesh deformation using the volumetric graph Laplacian. For purposes of discussion and exemplary illustration, operations of this procedure are described with respect to components of FIG. 1. The left-most digit of a component reference number identifies the particular figure in which the component first appears. Additionally, although FIG. 11 presents operations of procedure 1100 in a particular order, operations associated with any specific block of the procedure may be implemented in a different order. For example, operations of block 1104 may be implemented before operations of block 1102, and/or so on.

At block 1102, deformation module 108 constructs a volumetric graph 118 from an original mesh 116. In one implementation, deformation module 108 constructs the volumetric graph using intermediate inside and outside graph data structures. The inside graph is a simple lattice that is constructed to lie inside the original mesh 116. The inside graph includes original mesh points as well as derived points, and is used by deformation module 108 to prevent large volume changes during large mesh deformation operations. In one implementation, deformation module 108 constructs the inner graph using simplification envelopes to offset each vertex of the original mesh in the direction opposite its normal. In one implementation, deformation module 108 constructs the outside graph to prevent local self-intersection by iteratively offsetting each vertex of the original mesh toward the outside of the original mesh surface. Deformation module 108 builds connections between the inside and outside graphs and the original mesh 116 targeted for deformation to generate the volumetric graph.

At block 1104, deformation module 108 allows a user to specify a set of 3-D control curves 120. Each 3-D control curve identifies a set of points on the original mesh 116. In one implementation, deformation module 108 presents a user interface (UI) on a display device. A 3-D view of a original mesh 116 is presented to the user by the UI. Using a mouse, or some other type of pointing/selection device, the user selects a set of points on the original mesh 116 defining the 3-D control curve 120.

At block 1106, deformation module 108 allows the user to edit the 3-D control curves 120 as respective 2-D control curves 120 to generate deformed control curves 124. The deformed control curves 124 indicate how the original mesh 116 is to be deformed. In this implementation, a user specifies how the original mesh 116 is to be deformed as follows. Deformation module 108 projects the specified 3-D control curves 120 onto a projection plane within the UI as 2-D control curves 120. The user deforms the original mesh 116 by manipulating the projected 2-D control curves 120 using the provided UI. This indicates where the points specified in the 3-D control curves 120 are to be moved as a result of the defined deformation. For example, in one implementation, a user manipulates the projected 2-D control curves by selecting a 2-D control curve with a pointing device such as a mouse, a graphics pen, and/or so on, and modifies the 2-D control curve 120. For instance, the user may draw a new curve representing a target curve (i.e., deformation), directly edit the 2-D curve using B-spline control points presented on the 2-D curve by the UI, etc.

At block 1108, deformation module 108 creates the Laplacian of the volumetric graph 118 (i.e., the volumetric graph Laplacian 114) to encode volumetric details as the difference between each point in the graph and the average of its neighbors. These volumetric details are utilized during deformation operations to impose a volumetric constraint that prevents unnatural changes in volume. These volumetric details also included points a short distance outside the original mesh 116, which are used during deformation operations to substantially prevent local self-intersections of the volume.

At block 1110, deformation module 108 deforms the original mesh 116 based on the deformed control curves 124. In this manner, system 100 provides a curve-based deformation system allowing a user to create large mesh deformations.

An Exemplary Operating Environment

Figure 12:
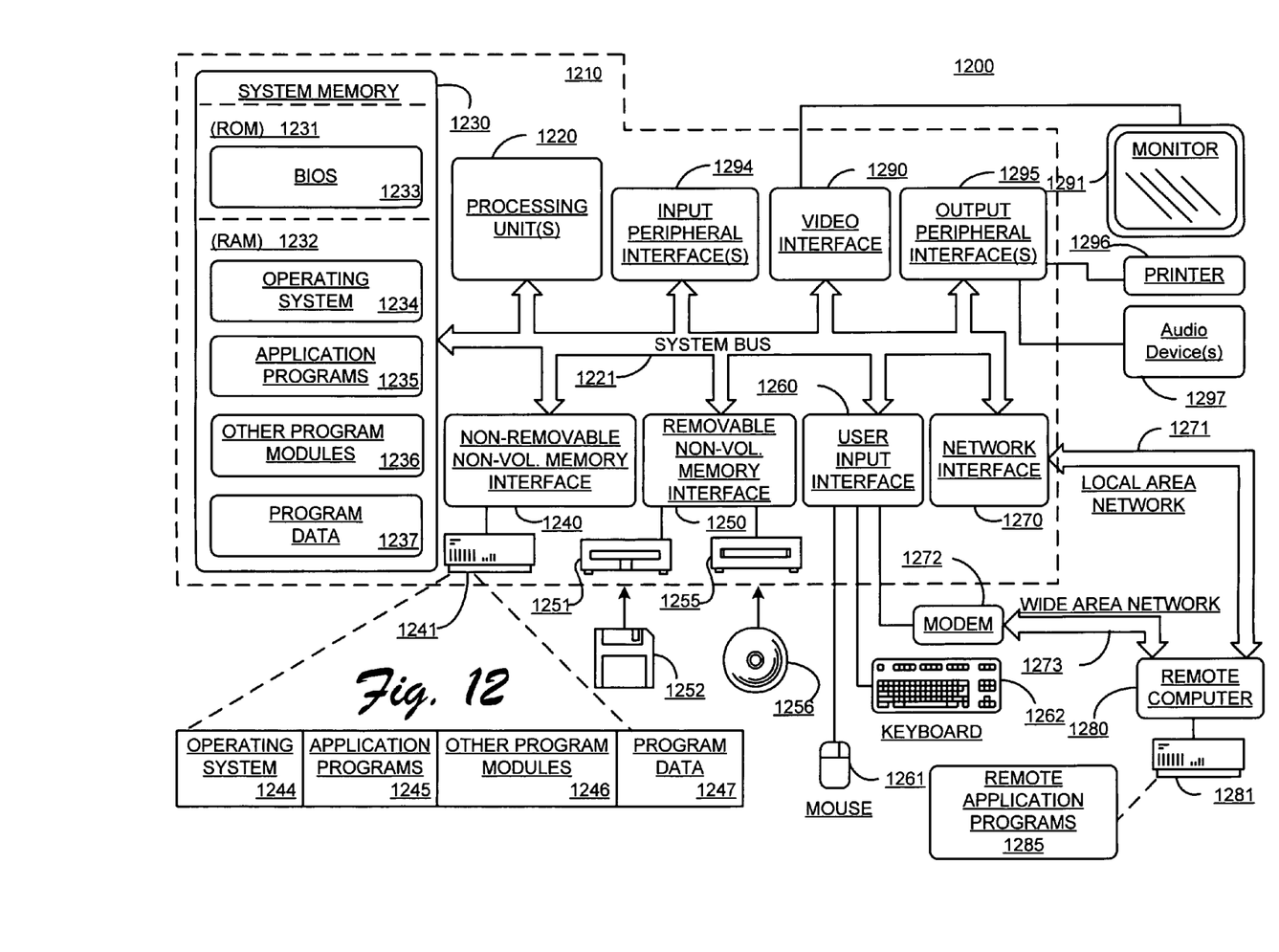
FIG. 12 illustrates an example of a suitable computing environment in which large mesh deformation using the volumetric graph Laplacian may be fully or partially implemented.

FIG. 12 illustrates an example of a suitable computing environment in which large mesh deformation using the volumetric graph Laplacian may be fully or partially implemented. Exemplary computing environment 1200 is only one example of a suitable computing environment for the exemplary system 100 of FIG. 1 and exemplary operations of FIG. 11, and is not intended to suggest any limitation as to the scope of use or functionality of systems and methods the described herein. Neither should computing environment 1200 be interpreted as having any dependency or requirement relating to any one or combination of components illustrated in computing environment 1200.

The methods and systems described herein are operational with numerous other general purpose or special purpose computing system, environments or configurations. Examples of well-known computing systems, environments, and/or configurations that may be suitable for use include, but are not limited to personal computers, server computers, multiprocessor systems, microprocessor-based systems, network PCs, minicomputers, mainframe computers, distributed computing environments that include any of the above systems or devices, and so on. Compact or subset versions of the framework may also be implemented in clients of limited resources, such as handheld computers, or other computing devices. The invention, although not required, may be practiced in a distributed computing environment where tasks are performed by remote processing devices that are linked through a communications network. In a distributed computing environment, program modules may be located in both local and remote memory storage devices.

With reference to FIG. 12, an exemplary system providing large mesh deformation using the volumetric graph Laplacian includes a general-purpose computing device in the form of a computer 1210 implementing, for example, system 100 of FIG. 1. Components of computer 1210 may include, but are not limited to, processing unit(s) 1220, a system memory 1230, and a system bus 1221 that couples various system components including the system memory to the processing unit 1220. The system bus 1221 may be any of several types of bus structures including a memory bus or memory controller, a peripheral bus, and a local bus using any of a variety of bus architectures. By way of example and not limitation, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

A computer 1210 typically includes a variety of computer-readable media. Computer-readable media can be any available media that can be accessed by computer 1210, including both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1210.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example and not limitation, communication media includes wired media such as a wired network or a direct-wired connection, and wireless media such as acoustic, RF, infrared and other wireless media. Combinations of the any of the above should also be included within the scope of computer-readable media.

System memory 1230 includes computer storage media in the form of volatile and/or nonvolatile memory such as read only memory (ROM) 1231 and random access memory (RAM) 1232. A basic input/output system 1233 (BIOS), containing the basic routines that help to transfer information between elements within computer 1210, such as during start-up, is typically stored in ROM 1231. RAM 1232 typically contains data and/or program modules that are immediately accessible to and/or presently being operated on by processing unit 1220. By way of example and not limitation, FIG. 12 illustrates operating system 1234, application programs 1235, other program modules 1236, and program data 1237.

The computer 1210 may also include other removable/non-removable, volatile/nonvolatile computer storage media. By way of example only, FIG. 12 illustrates a hard disk drive 1241 that reads from or writes to non-removable, nonvolatile magnetic media, a magnetic disk drive 1251 that reads from or writes to a removable, nonvolatile magnetic disk 1252, and an optical disk drive 1255 that reads from or writes to a removable, nonvolatile optical disk 1256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1241 is typically connected to the system bus 1221 through a non-removable memory interface such as interface 1240, and magnetic disk drive 1251 and optical disk drive 1255 are typically connected to the system bus 1221 by a removable memory interface, such as interface 1250.

The drives and their associated computer storage media discussed above and illustrated in FIG. 12, provide storage of computer-readable instructions, data structures, program modules and other data for the computer 1210. In FIG. 12, for example, hard disk drive 1241 is illustrated as storing operating system 1244, application programs 1245, other program modules 1246, and program data 1247. Note that these components can either be the same as or different from operating system 1234, application programs 1235, other program modules 1236, and program data 1237. Operating system 1244, application programs 1245, other program modules 1246, and program data 1247 are given different numbers here to illustrate that they are at least different copies.

A user may enter commands and information into the computer 1210 through input devices such as a keyboard 1262 and pointing device 1261, commonly referred to as a mouse, trackball or touch pad. Other input devices (not shown) may include a microphone, joystick, graphics pen and pad, satellite dish, scanner, or the like. These and other input devices are often connected to the processing unit 1220 through a user input interface 1260 that is coupled to the system bus 1221, but may be connected by other interface and bus structures, such as a parallel port, game port or a universal serial bus (USB).

A monitor 1291 or other type of display device is also connected to the system bus 1221 via an interface, such as a video interface 1290. In addition to the monitor, computers may also include other peripheral output devices such as printer 1296 and audio device(s) 1297, which may be connected through an output peripheral interface 1295.

The computer 1210 operates in a networked environment using logical connections to one or more remote computers, such as a remote computer 1280. The remote computer 1280 may be a personal computer, a server, a router, a network PC, a peer device or other common network node, and as a function of its particular implementation, may include many or all of the elements described above relative to the computer 1210, although only a memory storage device 1281 has been illustrated in FIG. 12. The logical connections depicted in FIG. 12 include a local area network (LAN) 1281 and a wide area network (WAN) 1273, but may also include other networks. Such networking environments are commonplace in offices, enterprise-wide computer networks, intranets and the Internet.

When used in a LAN networking environment, the computer 1210 is connected to the LAN 1271 through a network interface or adapter 1270. When used in a WAN networking environment, the computer 1210 typically includes a modem 1272 or other means for establishing communications over the WAN 1273, such as the Internet. The modem 1272, which may be internal or external, may be connected to the system bus 1221 via the user input interface 1260, or other appropriate mechanism. In a networked environment, program modules depicted relative to the computer 1210, or portions thereof, may be stored in the remote memory storage device. By way of example and not limitation, FIG. 12 illustrates remote application programs 1285 as residing on memory device 1281. The network connections shown are exemplary and other means of establishing a communications link between the computers may be used.

CONCLUSION

Although conventional differential-domain mesh deformation techniques preserve surface detail as a mesh is deformed, such existing techniques typically produce objectionable pinching and intersection artifacts when the deformation is large. System 100 of FIG. 1 addresses these problems by preserving volumetric details represented by the volumetric graph Laplacian. This solution avoids the intricacies of solidly meshing complex objects. Although the systems and methods for large mesh deformation using the volumetric graph Laplacian have been described in language specific to structural features and/or methodological operations or actions, it is understood that the implementations defined in the appended claims are not necessarily limited to the specific features or actions described. Rather, the specific features and operations of system 100 are disclosed as exemplary forms of implementing the claimed subject matter.

The invention claimed is:

1. A computer-implemented method comprising:
receiving information from a user indicating how an original mesh is to be deformed;
deforming the original mesh based on the information and a volumetric differential operator applied to a volumetric graph generated from the original mesh; and
wherein the volumetric differential operator is a Laplacian of the volumetric graph.

2. A method of claim 1, wherein the information is one or more 2-D control curves derived from one or more respective 3-D control curves specified with respect to the original mesh.

3. A method of claim 1, wherein the information is one or more new 2-D control curves specified by a user to represent deformation of the original mesh.

4. A method of claim 1, wherein deforming the original mesh is independent of solidly-meshing surface interior of the original mesh.

5. A method of claim 1, wherein the Laplacian of the volumetric graph encodes volumetric details of the original mesh as a volumetric difference between each point of multiple points in a volumetric graph and a volumetric average of neighbors of each point.

6. A method of claim 1, wherein the Laplacian of the volumetric graph encodes volumetric details to impose volumetric constraints that prevent unnatural changes in volume when deforming the original mesh, the volumetric details including points outside of the original mesh and a simple lattice-structure of points inside of the original mesh.

7. A method of claim 1, wherein the method further comprises:
allowing a user to specify one or more 3-D control curves on the surface of the original mesh;
presenting a respective 2-D control curve to the user corresponding to at least one of the one or more 3-D control curves; and
allowing the user to modify the 2-D control curve to specify movement of a set of points associated with the 2-D control curve responsive to deformation.

8. A method of claim 1, wherein the method further comprises generating the volumetric graph by:
creating inside and outside graph structures, the inside graph structure being a first lattice constructed to lie within the original mesh, the outside graph structure being a second lattice constructed to lie outside of the original mesh;
building a connection between the inside graph structure and the original mesh; and
connecting details of the outside graph structure with the original mesh.

9. A method of claim 1, wherein the method further comprises generating the volumetric graph by:
creating inside and outside graph structures, the inside graph structure being a first lattice constructed to lie within the original mesh, the outside graph structure being a second lattice constructed to lie outside of the original mesh;
preventing large volume changes during large mesh deformation operations associated with the original mesh using information based on the inside graph structure; and
obviating local self-intersection of vertices during large mesh deformation operations associated with the original mesh based on information based on the outside graph structure.

10. A method of claim 1, wherein deforming the original mesh further comprises balancing preservation of original surface details associated with the original mesh, a user's chosen deformation locations, and preservation of volumetric details specified by the Laplacian of the volumetric graph.

11. A computer-implemented method comprising:
presenting a user interface to a user, the user interface displaying a 3-D mesh;
allowing the user to specify a 3-D control curve with respect to the 3-D mesh;
projecting the 3-D control curve onto a plane as a 2-D control curve;
allowing the user to edit the 2-D control curve to create a modified control curve that specifies targeted deformation of the 3-D mesh; and
deforming the 3-D mesh based on a volumetric graph Laplacian derived from the 3-D mesh and the modified control curve.

12. The method of claim 11, wherein allowing the user to edit the 2-D control curve further comprises presenting the user with an opportunity to create a new curve, the new curve being the modified control curve.

13. The method of claim 11, wherein allowing the user to edit the 2-D control curve further comprises presenting B-spline control points on the 2-D control curve, the B-spline control points being selectable for manipulating shape and size of the 2-D control curve.

14. The method of claim 11, wherein deforming the 3-D mesh further comprises:
creating a volumetric graph based on vertices of the 3-D mesh, the volumetric graph comprising a simple-lattice of vertices inside of a surface associated with the 3-D mesh and vertices outside of the surface; and
determining a Laplacian of the volumetric graph to encode volumetric details as a difference between each point of multiple points in the volumetric graph and an average of points neighboring the point.

15. The method of claim 11, wherein deforming the 3-D mesh further comprises preventing large volume changes during large mesh deformation of the original mesh using information from a simple lattice formed inside of the 3-D mesh.

16. The method of claim 11, wherein deforming the 3-D mesh further comprises preventing self intersections of volume during large mesh deformations of the 3-D mesh using information from a graph generated outside of a surface of the 3-D mesh.

17. The method of claim 11, wherein deforming the 3-D mesh further comprises balancing preservation of original surface details associated with the 3-D mesh, a user's chosen deformation locations, and preservation of volumetric details specified by the volumetric graph Laplacian.

18. The method of claim 11, further comprising
creating a simple-lattice graph structure inside of the 3-D mesh using simplification envelopes to iteratively offset each vertex of multiple vertices of the original mesh in the direction opposite normal of the vertex;
generating an outside graph by iteratively offsetting each vertex of the original mesh outwards of a surface corresponding to the original mesh, the outside graph comprising vertices outside of the 3-D mesh;
building connections between the inside and outside graphs and the original mesh to create a volumetric graph.

19. The method of claim 18, further comprising simplifying the volumetric graph using edge collapse and smoothing operations.

* * * * *